D. MOORE.
REVOLVING FIRE-ARM.
No. 193,269. Patented July 17, 1877.
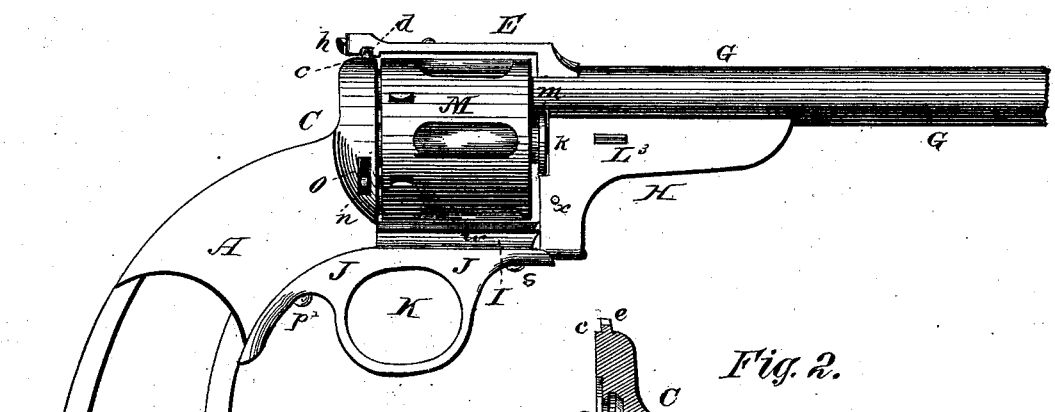
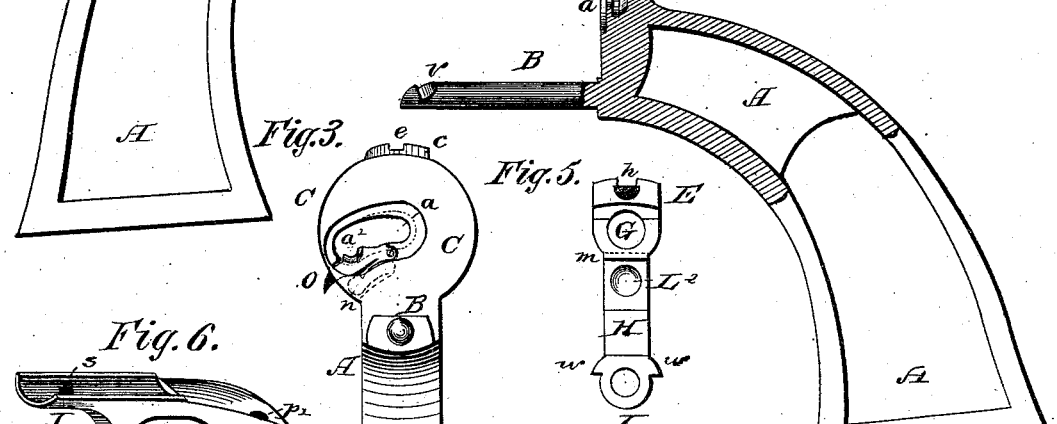
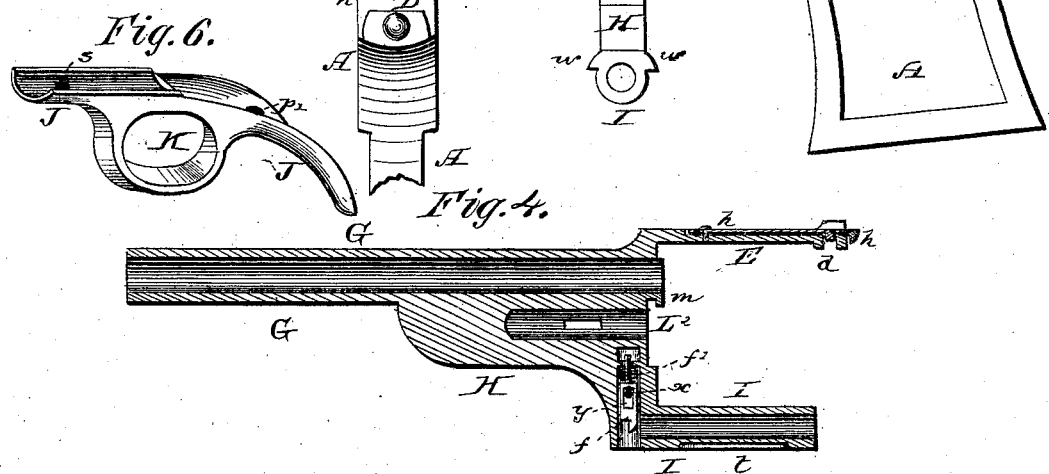
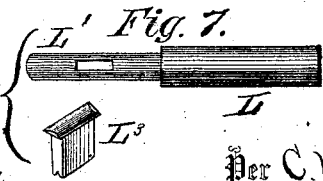

2 Sheets—Sheet 2.
D. MOORE.
REVOLVING FIRE-ARM.
No. 193,269. Patented July 17, 1877.
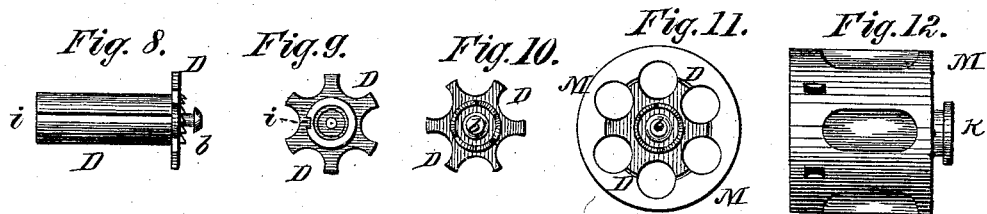
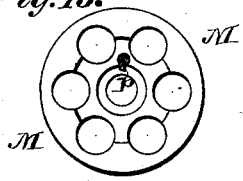
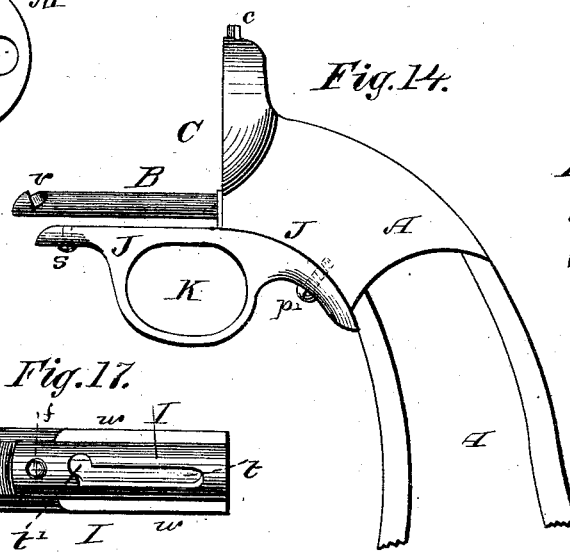
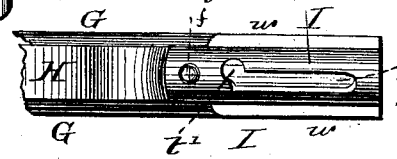
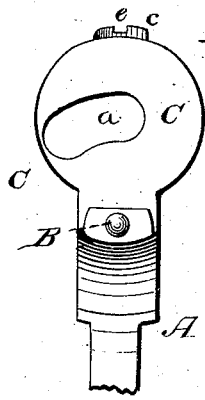
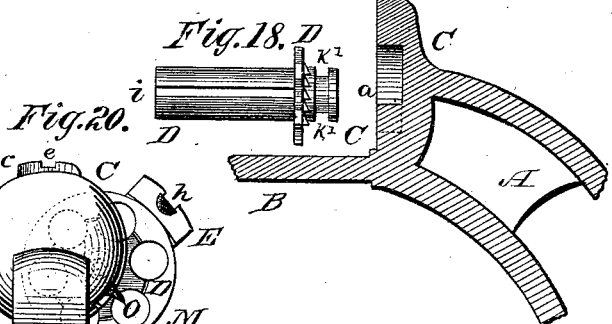
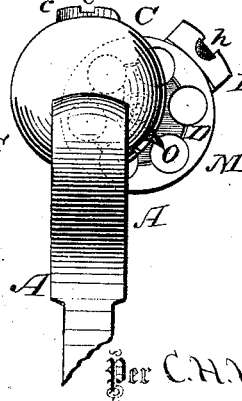
Witnesses:
P. C. Dieterich
Frank H. Duffy
Inventor:
Daniel Moore
Per C. H. Watson & Co.
Attorneys.

UNITED STATES PATENT OFFICE.

DANIEL MOORE, OF BROOKLYN, ASSIGNOR TO MERWIN, HULBERT & CO., OF NEW YORK, N. Y.

IMPROVEMENT IN REVOLVING FIRE-ARMS.

Specification forming part of Letters Patent No. 193,269, dated July 17, 1877; application filed June 19, 1877.

*To all whom it may concern:*

Be it known that I, DANIEL MOORE, of Brooklyn, in the county of Kings and State of New York, have invented certain new and useful Improvements in Revolving Fire-Arms; and I do hereby declare that the following is a full, clear, and exact description thereof, which will enable others skilled in the art to which it appertains to make and use the same, reference being had to the accompanying drawings, and to the letters of reference marked thereon, which form a part of this specification.

This invention relates to that class of fire-arms provided with a rotating cylinder with chambers bored clear through, for receiving the cartridges at its rear and extracting the shells therefrom after firing.

My improvement consists of various devices, as hereinafter described, the object and purpose of which are to facilitate the loading of the arm and extracting the shells therefrom after firing, with certainty, ease, and rapidity, and at the same time produce a strong, compact, and cheap revolver, said improvements being applicable to any desired size.

The parts are so arranged that the cylinder and barrel, when swung aside, carry the extractor laterally with them, by which movement the shells are loosened to the required extent, that renders easy their final extraction from the chambers by the forward longitudinal movement of the barrel and cylinder.

In order to enable others skilled in the art to which my invention appertains to make and use the same, I will now proceed to describe its construction and operation, referring to the annexed drawing, in which—

Figure 1 is a side elevation of a revolving fire-arm embodying my invention.

Fig. 2 is a longitudinal vertical section of the frame A, with the fulcrum slide-pin B attached thereto, and the recessed channel $a$ cut into the recoil-plate C, to receive the neck and collar $b$ of the extractor D, as shown in Fig. 8, also showing the angle projecting stud $c$ at the top of the recoil-shield, which stud receives and passes into the channel $d$, out angularly across the strap E, as shown in Fig. 4, and locks therein automatically by a spring forcing a catch into the transverse cut $e$. (Shown in Fig. 3.)

Fig. 3 is a front view of the recoil-plate C, giving a face view of the semicircular opening $a'$, to receive the collar $b$ of the extractor, and the channel $a$, to allow the neck of said collar to pass freely therein in its lateral movement. This channel $a$ is recessed at its rear to the same size as the collar $b$, as shown by dotted lines, but leaving sufficient metal at its front to fill the space between the ratchet-teeth of the extractor and the face of the collar $b$. This recoil face-plate is also cut away at the required point sufficiently to receive the ratchet-teeth of the extractor to the desired depth, and swing freely therein in its lateral movement. The metal left in the upper and lower sides of the channel $a$ forms a bearing for the collar-neck of the extractor, and which, when in position for firing, allows the free rotation of the extractor with the cylinder.

Fig. 4 shows the barrel G, strap E, and bracket H, with the rearwardly-extending cylindrical arm I and the springs $f'$ and $h$. Fig. 5 is a rear view of the same.

Fig. 6 shows the combined concaved strap J and guard K attached to the frame A.

Fig. 7 represents the center-pin L, upon which the cylinder M is received and rotated.

Fig. 8 is a side view of the sleeve-extractor D, having a channel, $i$, cut therein the entire length of the tubular portion, as shown. Fig. 9 is a front-end view, and Fig. 10 a rear-end view, of the same.

Fig. 11 is a rear view of the cylinder M, with extractor D therein.

Fig. 12 is a side view of the cylinder with its collar $k$, for locking into the recess $m$ at the rear end of the barrel.

Fig. 13 shows the cylinder with the extractor and center-pin removed.

Fig. 14 is a side view, showing the frame A, strap J, guard K, and fulcrum slide-pin B.

Fig. 15 shows a catch, O, with spring $n$, for the channel $a$ of the recoil-plate.

Fig. 16 shows the spring-catch for locking the barrel.

Fig. 17 is a bottom view of the cylindrical

Figs. 18 and 19 show a modification of the extractor and the channel in the face of the recoil-shield.

Fig. 20 is a rear view, showing the cylinder and parts thrown to the side.

The parts are assembled as follows: The cylinder M is placed in position with its collar $k$ taking under the clutch $m$ of the barrel G. The center-pin L is then passed through the cylinder, its smaller part $L^1$ taking into the cylindrical opening $L^2$ in the bracket H. The bolt $L^3$ is then driven through suitable openings made in said parts, thereby binding them firmly together. The extractor D is now placed within the cylinder and over the center-pin L, the stud $p$ (shown in Fig. 13) taking into the grooved channel $i$ of the extractor-sleeve. The concaved strap and guard J K are now fastened to the frame A by the screw $p'$, the rear part of this strap-face being concaved sufficiently to receive the rounded lower part of the frame, which, when screwed well up, renders the hold upon the frame very firm. The parts are now brought together by passing the slide-pin B within the cylindrical opening of the bracket-arm I, which arm, while passing over the slide-pin, with its peripheral surface, fills and fits into the concavity formed in the forward part of the strap J. This combination of supports—internally by the pin B and externally by the concavity of the strap J—gives very great strength and steadiness in the forward longitudinal movement of the barrel and cylinder. In the bottom of the channel $a$ of the recoil-shield is placed the catch O, the inner end of which is hinged, and the other end projects through a slot in the side of said shield, the spring $n$ underneath said catch holding it up in position. In the lower end of the bracket H is the dog $f$, operated by a coil-spring, $f'$, and its up-and-down movement limited by a pin, $x$, passing through a slot, $y$, therein, as shown in Fig. 4.

These devices having been placed in position, and the parts brought sufficiently close together to admit of the cylinder and barrel being swung aside on the fulcrum-pin B, the extractor is now drawn rearward by the finger until the collar $b$ passes into the semicircular opening $a'$, the spring-catch O acting automatically to admit the collar and closing over it when in proper position. The parts are now brought together, while thus swung aside, sufficiently to admit a screw, $s$, in the front end of the strap J, to enter a longitudinal slot, $t$, in the bottom of the arm I, and the whole is then brought together until checked by the point of the screw $s$, which brings the angular slot $t'$ (at the front end of the slot $t$) opposite said screw; and also the angular slot $d$ in the strap E opposite the angular stud $c$, in proper position to lock together. The barrel and cylinder are now swung to their central position for firing, all the parts acting in concert, and the spring $h$ at the top of the strap locking in the slot $e$ in the stud $c$, and the spring-dog $f$ catching in a notch, $v$, on the slide-pin B, thus automatically locking all the parts firmly together.

The bracket-arm I is, at its sides, provided with bead-like projections $w$ its entire length, one of which, when the barrel and cylinder are turned aside upon the fulcrum slide-pin B, arrests its lateral movement at the desired point for the forward longitudinal movement of the barrel for extraction of the shells, also forming an additional support during such movement with the pin B and concaved strap J.

The functions of the various parts, and the manner of operating the arm for extracting the empty shells and reloading thereafter, are as follows: With the right hand holding the frame, with the left hand seize the barrel and bracket, and with the thumb of the right hand press upward the spring $h$. This relieves the strap E from the stud $c$. Now, turn the barrel and cylinder to the left until arrested by the bead $w$ on the arm I, the pin B forming the axis on which to swing the parts. During this movement the screw-point $s$ passes out of the angular transverse slot $t'$ into the longitudinal slot $t$, and the spring-dog $f$ also is lifted out of the slot $v$. It is now relieved in all the required parts for sliding forward the barrel, which carries the cylinder with it by the clutch $m$ taking into the flange of the cylinder-collar $k$. The angular conformation of the slots $t'$, pin B, slot $d$, and stud $c$ work in conjunction to draw the cylinder forward with a screw-like power, and starting the shells from the chambers a distance in accordance with the degrees of angle given to said slots and studs. While thus turned aside, slide forward the barrel and cylinder, which movement extracts all of the shells, as the extractor is retained rearward by its collar $b$ being arrested by the spring-catch O.

For reloading the arm, draw the parts together while thus swung aside, which exposes the chambers sufficiently to insert the cartridges, and requires no opening in the recoil-shield, the cylinder being rotated by the thumb of the left hand.

It is necessary that the cylinder should be held without the aid of the hand in the turned-aside position while inserting the cartridges. To effect such result I provide the upper edge of the spring-catch O with a semicircular conformation, in which the neck of the collar $b$ of the extractor falls, and is retained therein by the upward pressure of the spring $n$, and yet relieves itself therefrom automatically when bringing the parts in position for firing.

It will also be noticed that the point of the vertically-acting spring-dog $f$ is beveled on its rearward face, so that when the parts are brought together for reloading this bevel takes upon the rounded point of the fulcrum slide-pin B, and is forced over it, the point of the dog falling into the slot $v$ therein, thus in the forward and backward movement acting automatically.

It will be further noticed that, after the cartridges are inserted into the chambers of the cylinder while it is turned aside for loading, the cartridges and the extractor are not fully home within the cylinder, but project rearward equal to the degree of angle of the starting slots and stud, as hereinbefore stated; but when the cylinder is swung to its true central position the face of the recoil-shield presses them home by action of the angular slots and stud while moving to their locking positions.

To separate the parts for cleaning, partially remove the screw $s$, turn aside the barrel, and slide it forward from off its fulcrum-pin B. The barrel and cylinder are thus separated from the frame, while the extractor remains attached to the recoil-shield. To separate the extractor, press downward the head of the spring-catch O, and it allows the separation of the extractor from the frame.

A spring-catch may be substituted for the screw $s$.

The lock-work for firing the cartridges and rotating the cylinder to be used in this revolver are of the usual and well-known construction, and require no description; nor are any of them shown in the drawing, as they form no part of this invention.

The opening or channel $a$ in the face of the recoil-plate C may be made without being enlarged at one end to receive an extractor with a collar-head at its rear, or being recessed for passing such head, as shown in Fig. 3 by dotted lines, but may be made its entire length the same size as the projecting neck or stud of an extractor made without such collar-head, the neck or stud being provided with a recess, $k'$, turned therein, as shown in Fig. 18, in which a proper clutch or spring-catch may take for retaining the extractor rearward when the shells are being extracted from the cylinder-chambers by the forward movement of the barrel and cylinder; but I prefer making the extractor and the opening in the recoil-shield as shown in Figs. 3 and 8.

Having thus fully described my invention, what I claim as new, and desire to secure by Letters Patent, is—

1. In a revolving fire-arm, a frame, a fulcrum slide-pin, and a concaved strap and guard, constructed substantially as herein set forth.

2. In a revolving fire-arm, a frame with a fulcrum slide-pin projecting forward at the lower part of the recoil-shield, and a recessed opening in the shield, in combination with an extractor, substantially as set forth.

3. The combination of a frame, a fulcrum slide-pin, a barrel, a sliding bracket-arm, a cylinder, a center-pin, and an extractor, combined and operating substantially as described, whereby, when the barrel and cylinder are swung aside upon the fulcrum slide-pin, the extractor is carried with them laterally, and operated substantially as herein set forth.

4. An opening and recessed channel in the face of the recoil-shield of a revolver, in combination with an extractor and a clutch, for the purposes herein set forth.

5. The automatic spring-dog $f$, contained within the bracket H, in combination with the fulcrum slide-pin B and its notch $v$, for the purposes herein set forth.

6. The spring-catch O, formed with a semi-circular edge, and arranged within the recessed recoil-shield, for the purposes herein set forth.

7. In a revolving fire-arm, a barrel and cylinder turning sidewise upon a fulcrum below the cylinder, and then movable longitudinally forward on said fulcrum for extracting the shells, and whereby the cylinder may be loaded without the necessity of cutting an opening in the recoil-shield, as herein set forth.

8. In a revolving fire-arm, the combination of a fulcrum slide-pin projecting from the bottom of the recoil-shield, a concaved strap projecting parallel therewith from the bottom of the frame, and a cylindrical arm projecting from the barrel-bracket, and fitting over the pin and in the strap, whereby both an interior and an exterior bearing are obtained for the same, as herein set forth.

9. The beads $w$, formed upon the sides of the cylindrical bracket-arm I, in combination with the guard-strap, for the purposes herein set forth.

10. In a revolving fire-arm, a frame, a barrel, a cylinder, and an extractor, so arranged that, by a lateral and longitudinal movement upon a fulcrum slide-pin, the extractor moves laterally therewith, but is retained at the recoil-shield by proper devices during the forward movement of the barrel and cylinder upon the fulcrum slide-pin, for extracting the empty shells of the cartridges from the chambers of the cylinder, constructed substantially as and for the purpose set forth.

In testimony that I claim the foregoing as my own I have hereto affixed my signature in presence of two witnesses.

DANIEL MOORE.

Witnesses:
  EDWIN MOORE,
  LEVI BAXTER.